(12) United States Patent
Olsen et al.

(10) Patent No.: US 7,619,362 B2
(45) Date of Patent: Nov. 17, 2009

(54) OUTER JACKET LEAK DETECTION METHOD AND BALLAST IMPLEMENTING THE METHOD

(75) Inventors: Joseph A. Olsen, Gloucester, MA (US); Nancy H. Chen, North Andover, MA (US)

(73) Assignee: OSRAM Sylvania Inc., Danvers, MA (US)

( * ) Notice: Subject to any disclaimer, the term of this patent is extended or adjusted under 35 U.S.C. 154(b) by 347 days.

(21) Appl. No.: 11/836,559

(22) Filed: Aug. 9, 2007

(65) Prior Publication Data

US 2009/0039803 A1 Feb. 12, 2009

(51) Int. Cl.
*H01J 17/18* (2006.01)
*G05F 1/00* (2006.01)

(52) U.S. Cl. ............... 313/623; 313/624; 313/324; 313/573; 315/309; 315/311; 315/307; 315/291

(58) Field of Classification Search .......... 315/56–63, 315/224, 291–311; 313/623–626, 324, 323, 313/317, 318.02, 318.01, 512, 160, 161, 313/573, 568, 567, 570
See application file for complete search history.

(56) References Cited

U.S. PATENT DOCUMENTS

| 7,002,305 | B2 | 2/2006 | Kambara et al. |
| 7,129,647 | B2 | 10/2006 | DuLaney et al. |
| 7,382,101 | B2 * | 6/2008 | Fukuda et al. ............ 315/308 |

\* cited by examiner

*Primary Examiner*—Tuyet Vo
(74) *Attorney, Agent, or Firm*—Robert F. Clark

(57) ABSTRACT

A method of detecting a leak in an outer jacket of a metal halide lamp having an arc tube inside the outer jacket and operated by a ballast, where the ballast monitors an electrical characteristic of the lamp during start and detects a leak in the outer jacket when the electrical characteristic deviates from that of a corresponding metal halide lamp whose outer jacket does not have a leak. The electrical characteristic is one of six markers, namely (1) V'(E) at a predetermined E, where V'(E) is a derivative of lamp voltage V as a function of cumulative energy E delivered to the ballast since ignition, (2) a value of E at which V'(E) reaches a maximum, (3) V at a predetermined E, (4) a local maximum of V'(E) up to a predetermined E, (5) a global maximum of V'(E), and (6) E required to achieve a predetermined V.

14 Claims, 10 Drawing Sheets

OUTER JACKET LEAK DETECTION METHOD AND BALLAST IMPLEMENTING THE METHOD

BACKGROUND OF THE INVENTION

The present invention is directed to a method of detecting a leak in an outer jacket of a metal halide lamp and a lamp and ballast that carry out the method.

Metal halide lamps include an arc tube inside an outer jacket and are operated by a ballast. One of the problems associated with such metal halide lamps is that the outer jacket can leak without causing failure of the arc tube. A leak in the outer jacket degrades lamp operation or causes the lamp to fail and a serious leak can lead to a more dangerous situation, such as UV exposure, electrical shock, and/or hot projectiles. It is desirable to detect these leaks to be able to take corrective action.

In new metal halide lamps, the traditional magnetic ballasts are being replaced with newer electronic ballasts that have increased functionality. For example, the electronic ballast may include a processor and/or other electronic components that can be programmed or otherwise arranged to perform various functions related to lamp operation. See, for example, the electronic ballasts in U.S. Pat. Nos. 7,002,305 and 7,129,647.

SUMMARY OF THE INVENTION

An object of the present invention is to provide a novel method of detecting a leak in an outer jacket of a metal halide lamp that takes advantage of the increased functionality of the ballast.

A further object of the present invention is to provide a novel method of detecting a leak in an outer jacket of a metal halide lamp, where the ballast monitors an electrical characteristic of the lamp during start and detects a leak in the outer jacket when the electrical characteristic deviates from a predetermined value.

More specifically, the monitored electrical characteristic is one of six markers, namely (1) V'(E) at a predetermined E, where V'(E) is a derivative of lamp voltage V as a function of cumulative energy E delivered to the ballast since ignition, (2) a value of E at which V'(E) reaches a maximum, (3) V at a predetermined E, (4) a local maximum of V'(E) up to a predetermined E, (5) a global maximum of V'(E), and (6) E required to achieve a predetermined V.

A yet further object of the present invention is to provide a novel metal halide lamp in which the method is implemented.

Another object of the present invention is to provide a novel ballast for a metal halide lamp in which the method is implemented.

These and other objects and advantages of the invention will be apparent to those of skill in the art of the present invention after consideration of the following drawings and description of preferred embodiments.

DETAILED DESCRIPTION OF THE INVENTION

Figure 1:
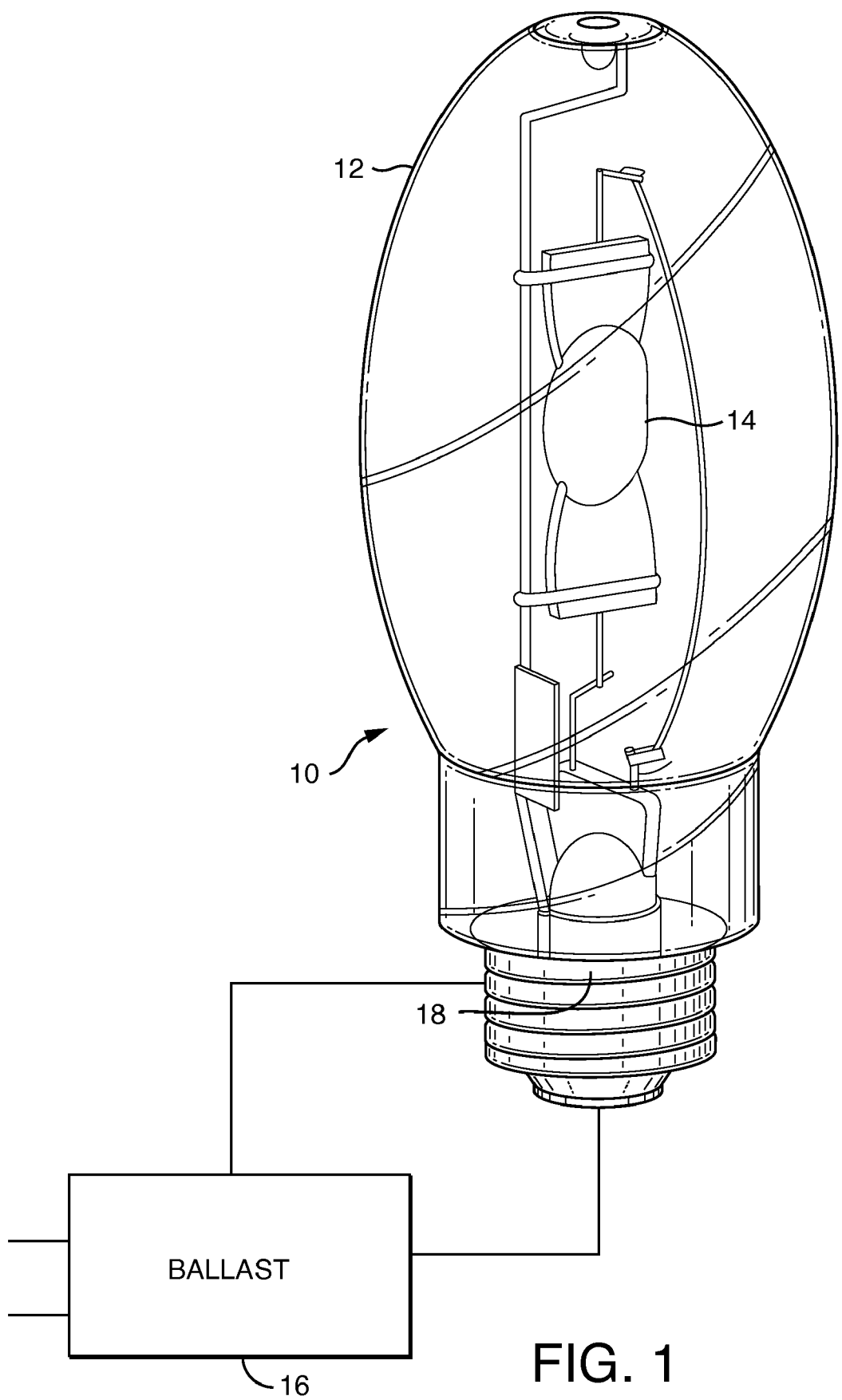
FIG. 1 is pictorial representation of a metal halide lamp in which the present invention is implemented.

With reference now to FIG. 1, a metal halide lamp 10 in which the present invention is implemented includes an outer jacket 12, an arc tube 14 inside outer jacket 12, and base 18. The base 18 is electrically connected to an electronic ballast 16 that operates the lamp. Electronic ballast 16 is connected to a source of electric power (not shown). The thermal properties of lamp 10 depend on power loss from arc tube 14 through radiation, conduction, and convection. The outer jacket is sealed to preserve a low pressure (near vacuum) around arc tube 14 to reduce convective power loss. The outer jacket 12, arc tube 14, base 18, and ballast 16 may take various forms and are not limited to the particular arrangement shown in FIG. 1.

The start-up behavior of lamp 10 is dependent on the pressure of the gas surrounding arc tube 14, since the pressure affects the rate of heat loss from the arc tube. The lamp is expected to warm more slowly in a one atmosphere environment compared to a vacuum, for example. The present inventors have found that close monitoring of the start-up behavior of the lamp can be used to detect a change in the surrounding gas pressure that may be due to a leaky outer jacket. Specifically, they have found that an outer jacket that leaks will increase the convective power loss that will change the electrical characteristics of the lamp that can be sensed in the ballast. By comparing the electrical characteristics during start of a lamp with and without the vacuum in the outer jacket, the different electrical characteristics may be determined and the ballast may be programmed or otherwise arranged to detect the leak based on the different electrical characteristics.

The extent of lamp warming is inferred by the evaporation of the mercury dose (or other suitable material, such as zinc in a mercury-free lamp), which can be detected by its affect on the lamp voltage, in particular the lamp voltage V (and derivatives) as a function of total energy E delivered by the ballast to the lamp since ignition. Due to various energy loss channels such as emission, conduction, radiation, etc., the amount of energy available to heat the arc tube is expected to be less than, but somewhat related to, the total energy expended in the arc. The warming of a lamp can, of course, be detected by monitoring parameters such as light output and arc tube temperature, but of particular interest is behavior that can be measured by the ballast only. Thus, the measurements herein are electrical in nature and do not involve measurements of light or temperature that would require photodetectors, thermocouples, etc.

The method of detecting a leak in outer jacket 12 of metal halide lamp 10 having arc tube 14 inside the outer jacket and ballast 16, includes the steps of, in ballast 16, monitoring a first electrical characteristic of lamp 10 during start of the lamp, and detecting a leak in outer jacket 12 when the monitored first electrical characteristic deviates from a predetermined value of the first electrical characteristic. The first electrical characteristic preferably is one of six markers; namely, (1) V'(E) at a predetermined E, where V'(E) is a derivative of lamp voltage V as a function of cumulative energy E delivered to the ballast since ignition, (2) a value of E at which V'(E) reaches a maximum, (3) V at a predetermined E, (4) a local maximum of V'(E) up to a predetermined E, (5) a global maximum of V'(E), and (6) E required to achieve a predetermined V.

Ballast 16 is programmed or otherwise arranged to monitor the first electrical characteristic, to include the predetermined value of the first electrical characteristic, and to compare the monitored first electrical characteristic with the predetermined value of the first electrical characteristic. An alarm signal may be triggered when ballast 16 detects the leak or the ballast can be programmed to prevent further lamp operation once a leak is detected. Arranging the ballast to perform these functions is within the skill of the artisan and need not be explained in detail.

The predetermined value of the first electrical characteristic may be determined by using a test lamp that does not have a leak in the outer jacket. A value of the first electrical characteristic may be recorded in the test lamp during start of the test lamp, where the recorded value is the predetermined value of the first electrical characteristic.

The first electrical characteristic may be one or more the six markers given above. When plural different markers are used, ballast 16 monitors the plural different ones of the first electrical characteristic and repeats the detecting step for each of the plurality of different ones of the first electrical characteristic using a respective different predetermined value for each of the plurality of different ones of the first electrical characteristic.

Figure 2:
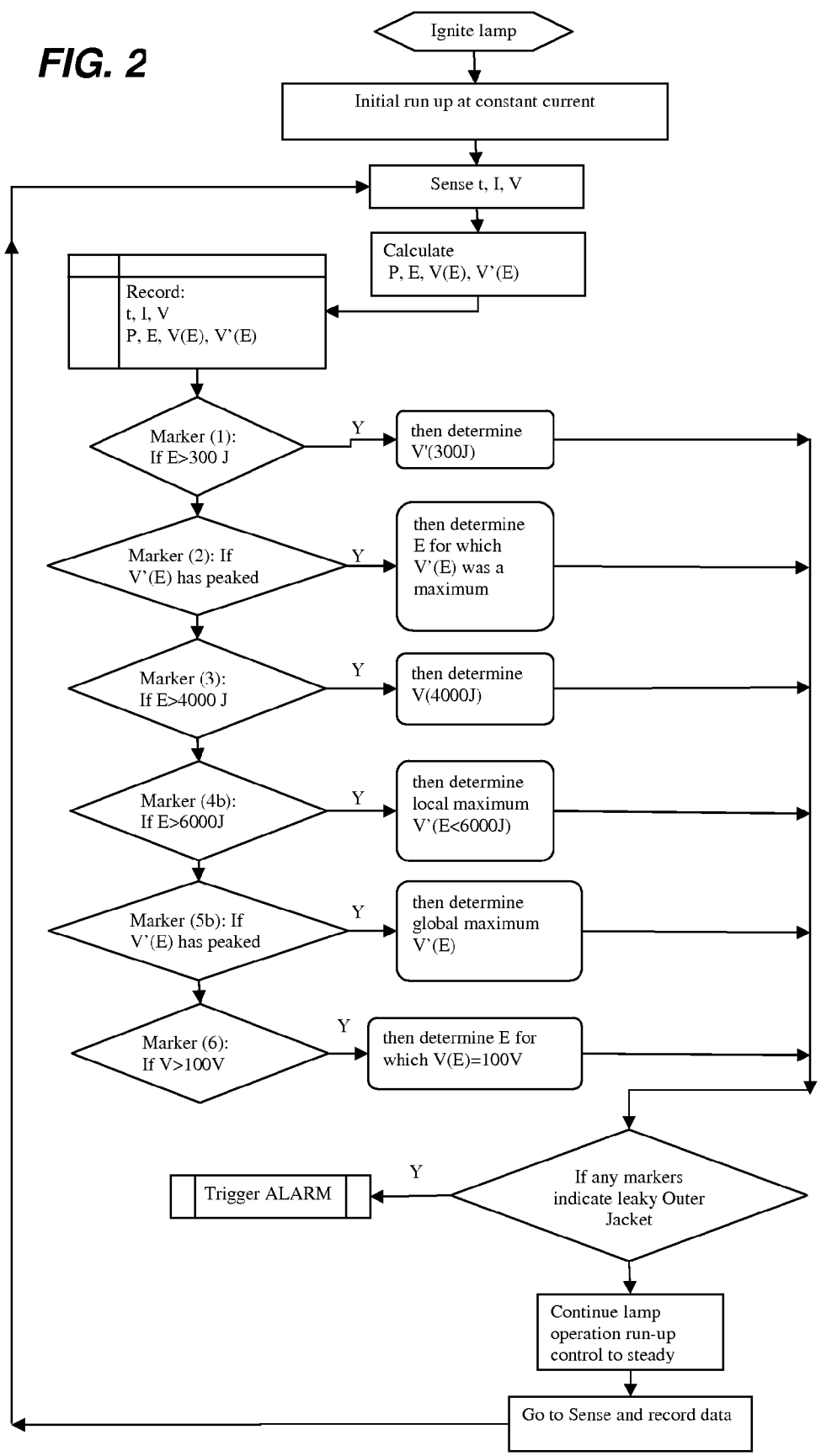
FIG. 2 is a flow chart depicting an embodiment of the method of the present invention.

An example of the method is illustrated in FIG. 2, which includes particular (non-limiting) examples of predetermined values and all six markers. As will be appreciated by those of skill in the art, the selection of the appropriate one (or more) of the first electrical characteristic and the predetermined value will depend on a variety of factors, such as lamp type, lamp orientation in use, etc.

The outer jacket of the lamp also may be checked for leaks at times other than during start. For example, the ballast may monitor a further electrical characteristic of the lamp during steady state operation of the lamp, and detect a leak when the monitored further electrical characteristic during steady state operation deviates from a predetermined value of the further electrical characteristic. In addition, the ballast may periodically measure a re-strike voltage of the lamp during shut off of the lamp, and detect a leak when the monitored re-strike voltage during shut off deviates from a predetermined value of the re-strike voltage. The monitored electrical characteristics may be one or more of the six markers identified above.

The present invention also encompasses a metal halide lamp with a ballast that is arranged to perform the method. The ballast may include a processor (internal to the ballast and not shown separately) that is programmed to monitor the first electrical characteristic, to include the predetermined value of the first electrical characteristic, and to compare the monitored first electrical characteristic with the predetermined value of the first electrical characteristic. The present invention also encompasses a ballast for a metal halide lamp, where the ballast includes the processor that is arranged to perform the method.

EXAMPLES

The arc tubes for two commercially available metal halide lamps, a 35 W ceramic arc tube and a 400 W quartz arc tube, were operated in a bell jar at various nitrogen pressures, to determine their relative sensitivity to this pressure.

35 W ceramic arc tube: For the 35 W ceramic arc tube, the markers tested were the value of V'(E), the derivative of the voltage with respect to total energy delivered by the ballast, at E=300 J, the value of E at which V'(E) reaches a maximum, and the lamp voltage V(E) at E=4000 J, which is essentially the steady state lamp voltage for a fully warmed lamp.

For a given amount of energy delivered to the arc, a lamp in vacuum is expected to warm the quickest since the rate of conductive heat loss is lowest, assuming that all other heat loss channels are not significantly affected. Also, the steady state lamp voltage is generally expected to be highest in a vacuum since the arc tube temperature and thus condensate pressure is maximized. In the case of a vacuum, the first and third markers should be relatively high and the second marker relatively low. As the surrounding pressure increases, the first and third markers should decrease, and the second marker should increase, relative to the values at vacuum.

For the first marker, the particular value of E at which V'(E) is measured was chosen because examination of typical V'(E) run-up curves indicated this to be a relatively flat part of the curve for which consistent measurements could be obtained. Since the sampling frequency during run-up was only about 1 Hz, simple fits were used to determine the marker values more precisely. For the first and third markers, V''' at E=300 J and V at E=4000 J were determined by linear interpolation between the measured data points. For the second marker, the E at which V'(E) reaches a maximum was determined by fitting (quadratic) to the three measured data points closest to the observed peak in V'(E).

Warm-up operation was controlled by a computerized setup which provided a constant run-up current of 1 A to full light output, then controlled power to maintain full light output as the lamp warmed to steady state. Total run time was about two minutes. For the run-up path chosen, the three markers were determined at approximately 15, 20-23, and 110-114 seconds after ignition.

Figure 3:
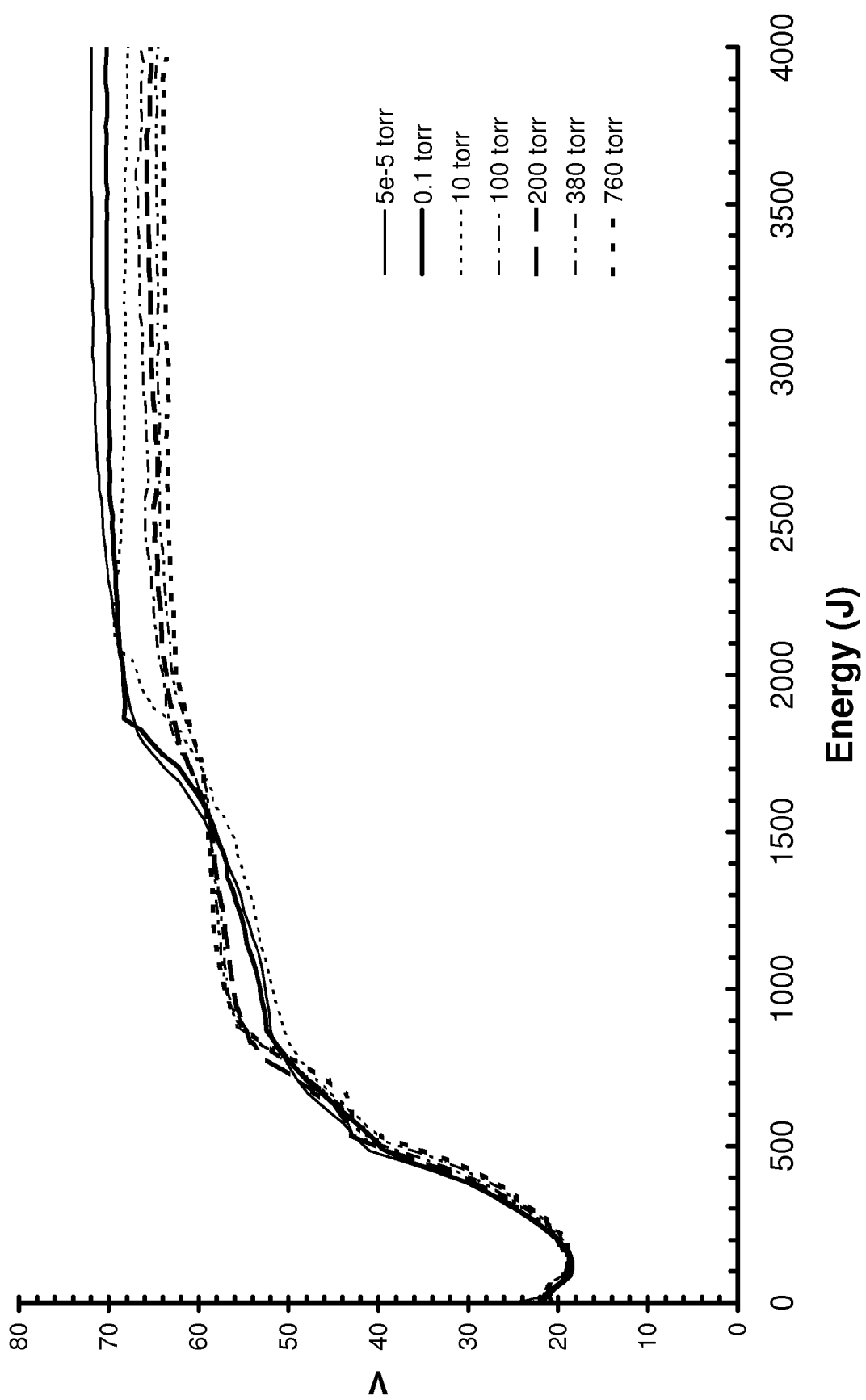
FIG. 3 is a graph depicting lamp voltage (V) vs. total supplied energy (E) in joules for a first example of the method of the present invention.
Figure 4:
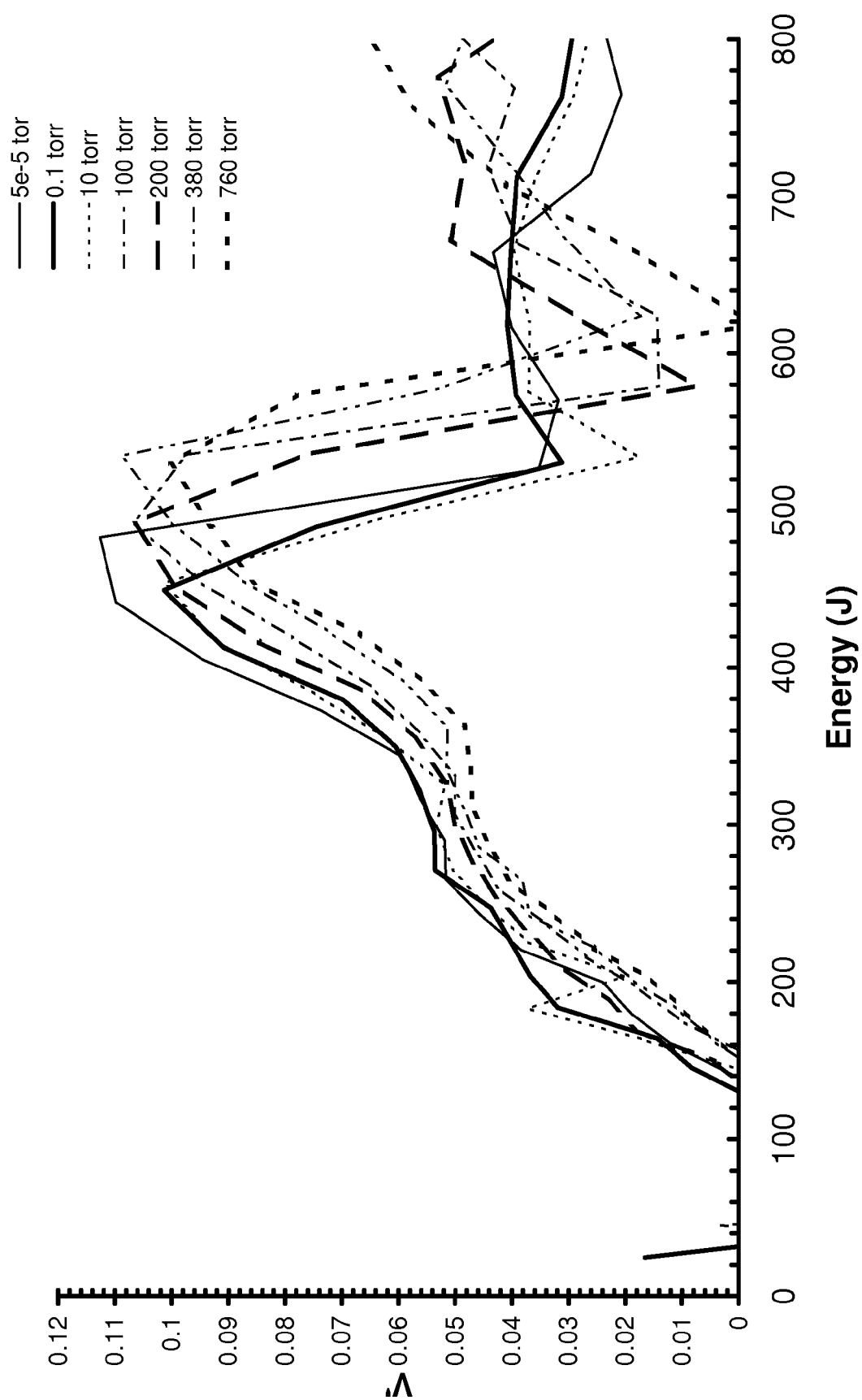
FIG. 4 is a graph depicting a derivative of lamp voltage (V) as a function of total supplied energy (E) in joules for the example of FIG. 3.

Example data illustrating the behavior of V(E) and V'(E) at different bell jar pressures is shown in FIGS. 3 and 4.

Figure 5:
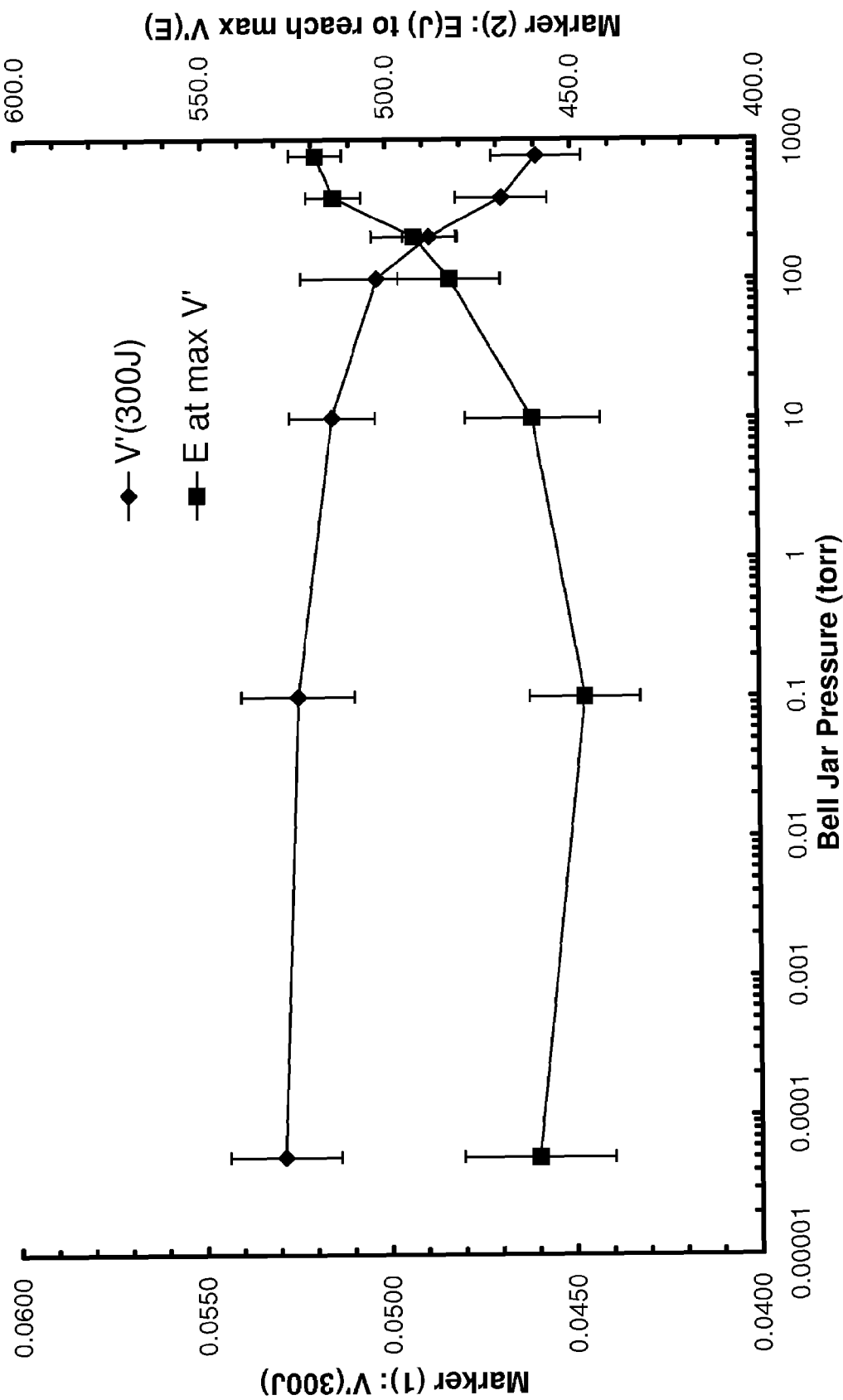
FIG. 5 is a graph depicting two markers for the first example of FIGS. 3-4.
Figure 6:
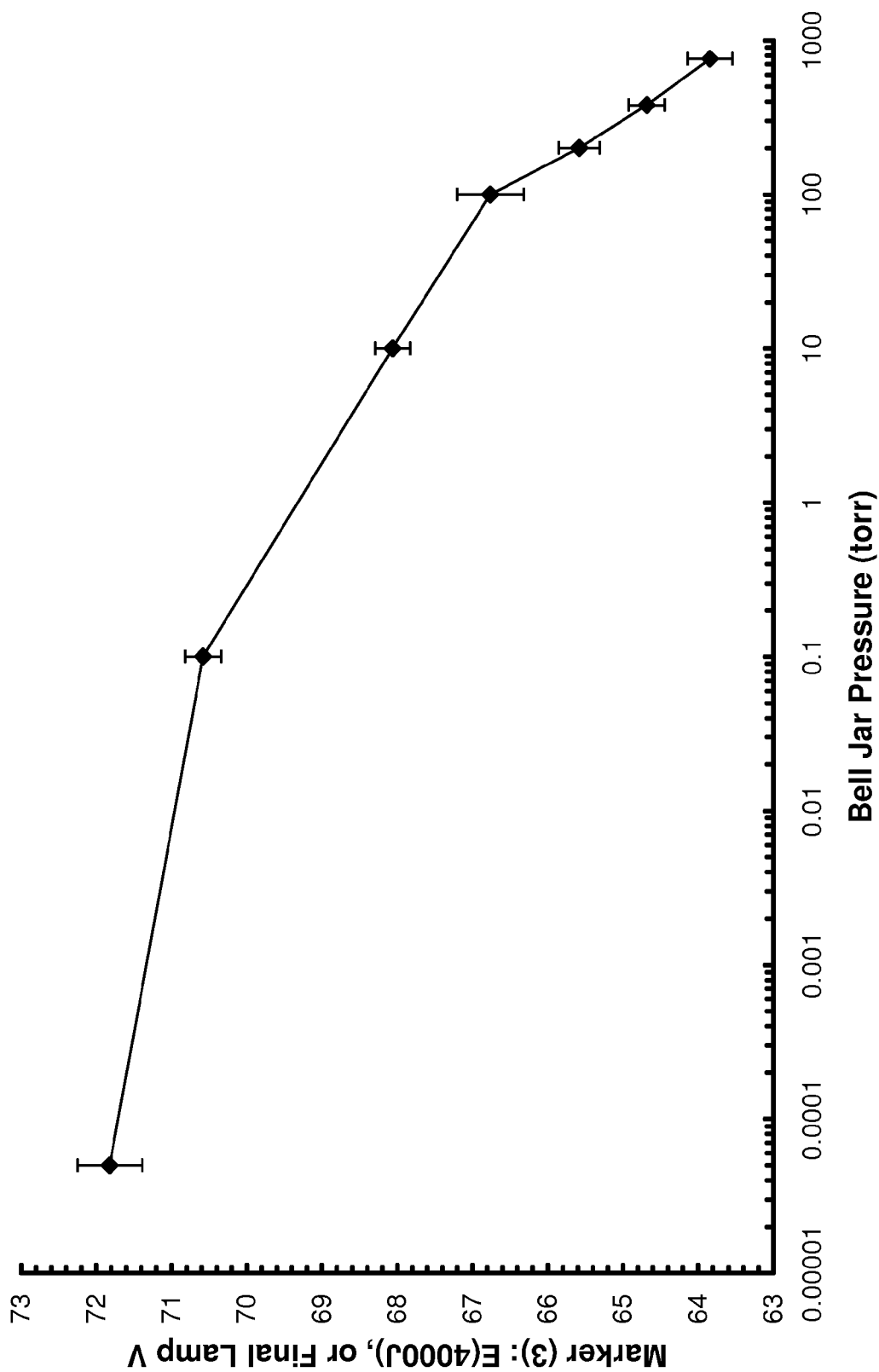
FIG. 6 is a graph depicting a third marker for the first example of FIGS. 3-4.

The markers extracted from the above data are plotted in FIGS. 5 and 6, respectively, as a function of bell jar nitrogen pressure. The error bars indicate the standard deviation obtained from repeating the run-up measurements five times at each pressure.

The observed sensitivity of the first and second markers to pressure indicates that an outer jacket failure which results in exposure of the arc tube to atmospheric pressure should reasonably be detected by an appropriately programmed ballast. The data suggests that pressures below about 100 torr might be distinguishable from pressures above about a few hundred torr. Detecting small leaks which result in pressure increases of less than 100 torr from vacuum is unlikely using these markers. (The lowest detectable pressure increases will depend on the outer jacket size.) The third marker appears to have higher sensitivity as a leaky jacket detector, as the steady state voltage is quite sensitive to the surrounding pressure. It is noted that lamp-to-lamp variations common within a typical batch of nominally identical metal halide lamps may have an effect on the results and the use of the markers should be carefully evaluated to determine their feasibility. The markers may be improved when a method of detecting relamping is included and when accounting for variations in lamp orientation, lamp repositioning, lamp-to-lamp voltage scatter, uncontrolled lamp shut-off which leaves the lamp in an atypical state for the next run-up, and irregular lamp "flashing" during run-up.

400 W quartz arc tube: The use of V(E) and V'(E) markers for the detection of leaky outer jackets was further explored using a 400 W quartz arc tube. As with the 35 W ceramic example above, the arc tube was removed from its jacket and placed in a bell jar, with run-up measurements made at various nitrogen pressures. Run-up current was limited to 4 A. Total run time was about 200 seconds.

Figure 7:
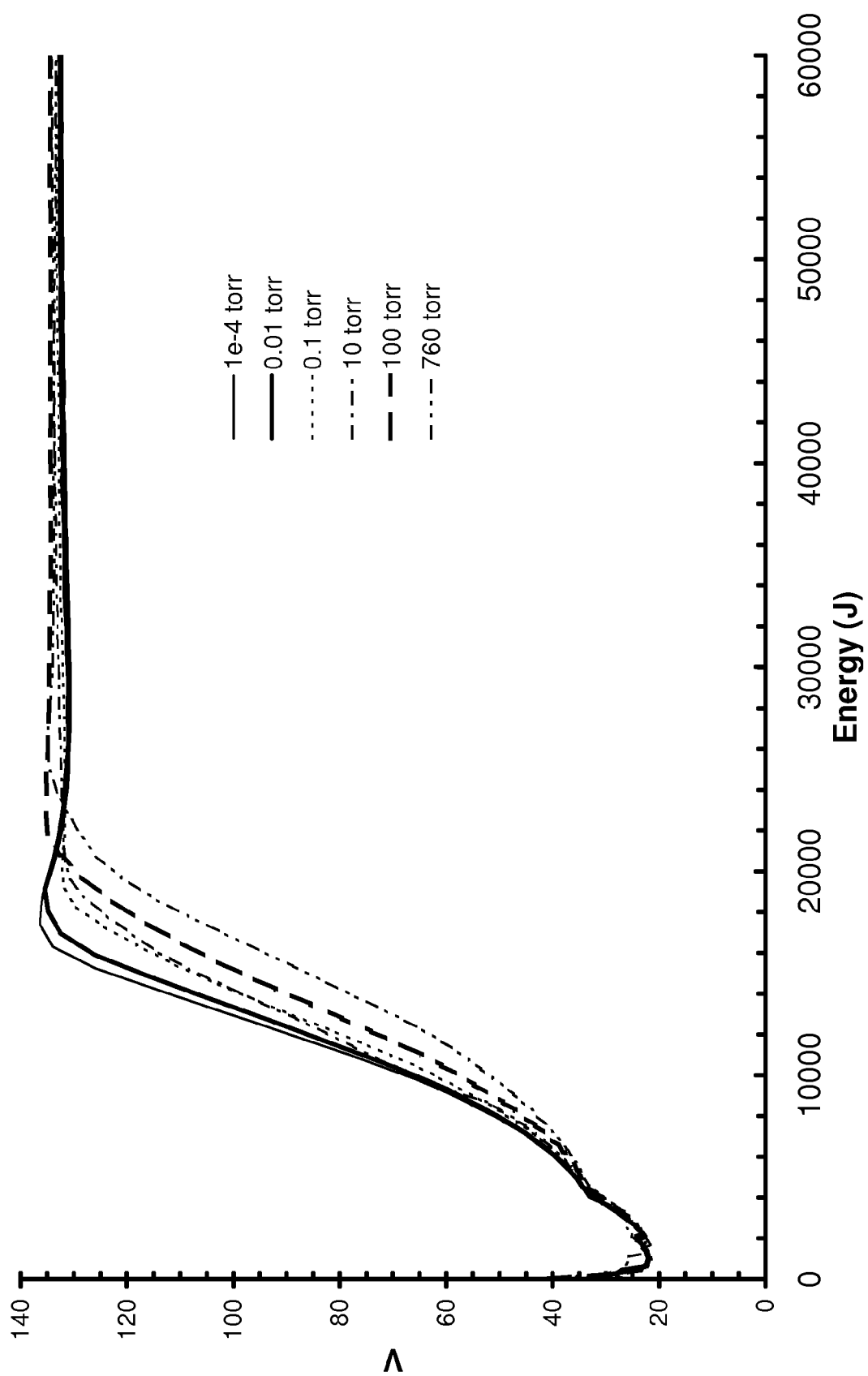
FIG. 7 is a graph depicting lamp voltage (V) vs. total supplied energy (E) in joules for a second example of the method of the present invention.
Figure 8:
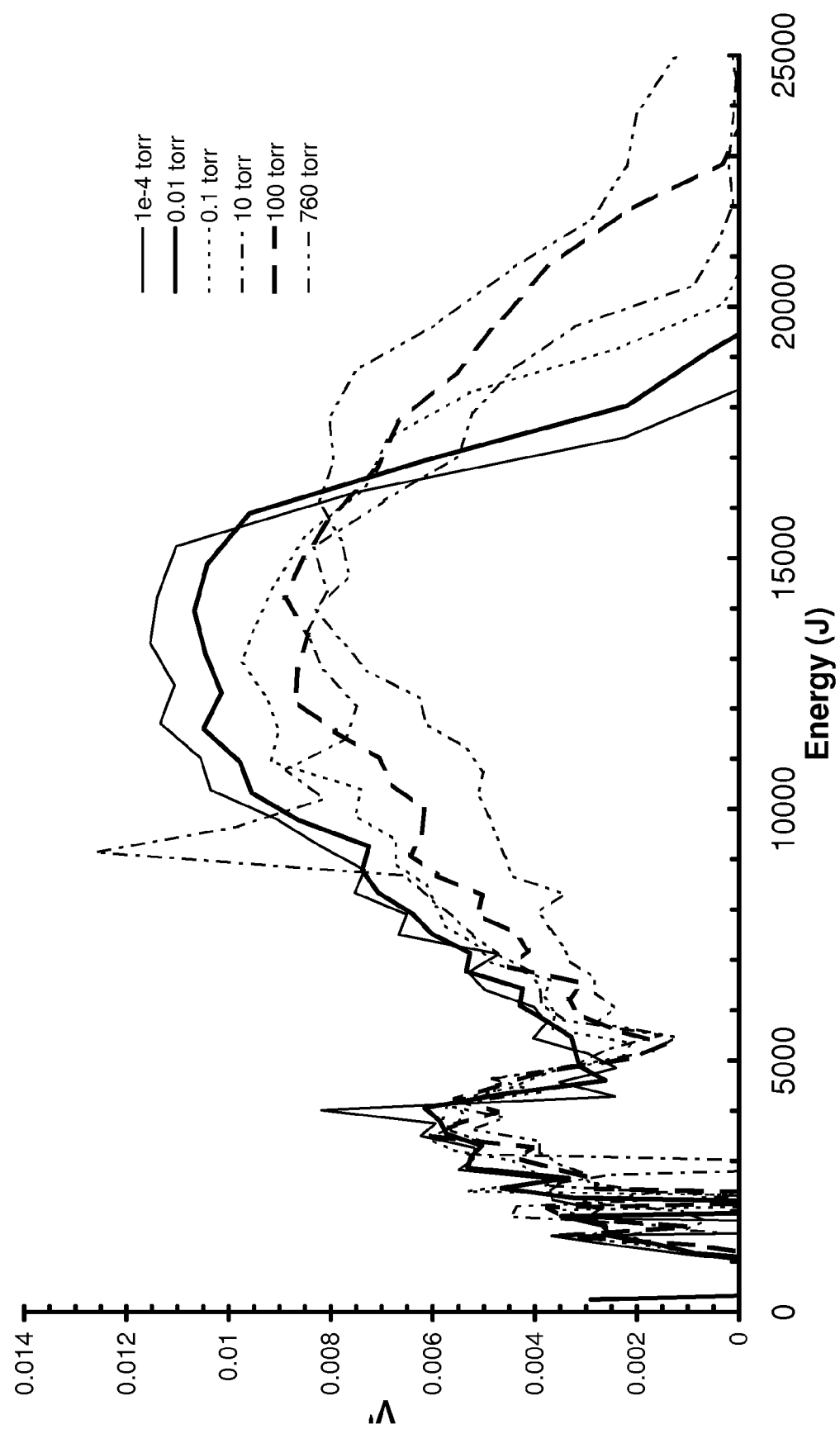
FIG. 8 is a graph depicting a derivative of lamp voltage (V) as a function of total supplied energy (E) in joules for the example of FIG. 7.

FIGS. 7-8 are examples of the run-up behavior of V(E) and V'(E) at different bell jar pressures. Initially the same three markers as the first example were used. However, it was observed that the slightly different V'(E) and V(E) behavior of the 400 W quartz arc tube called for adjustments to be made in the measured markers.

In the previous example, the first marker was the value of V' at a specific reference energy, in that case E=300 J, which corresponded to a relatively flat part of the V'(E) curve for which convenient and consistent measurements were possible. In the present example, there is again a region of the V'(E) curve which is relatively flat, corresponding to a broad peak in V' around E=3000-4000 J, but this feature shifts slightly with bell jar pressure. Since the magnitude of this broad peak is also affected by the bell jar pressure, a fourth marker was defined as the local maximum value of V'(E) in the region where E is less than about 6000 J.

The second marker, which was defined previously as the energy at which V'(E) reached its greatest value during run-up, was also more difficult to measure in the present example, due to the increased broadness of the V'(E) curve in the region of interest, E=10000-15000 J. This global maximum in V'(E) occurs at a later stage during run-up from the local maximum just discussed with respect to the fourth marker. The two maxima are similar in that they are both broad and the peak amplitude is affected by bell jar pressure. Hence, a fifth marker was defined which is the global maximum of V'(E) during run-up.

Figure 9:
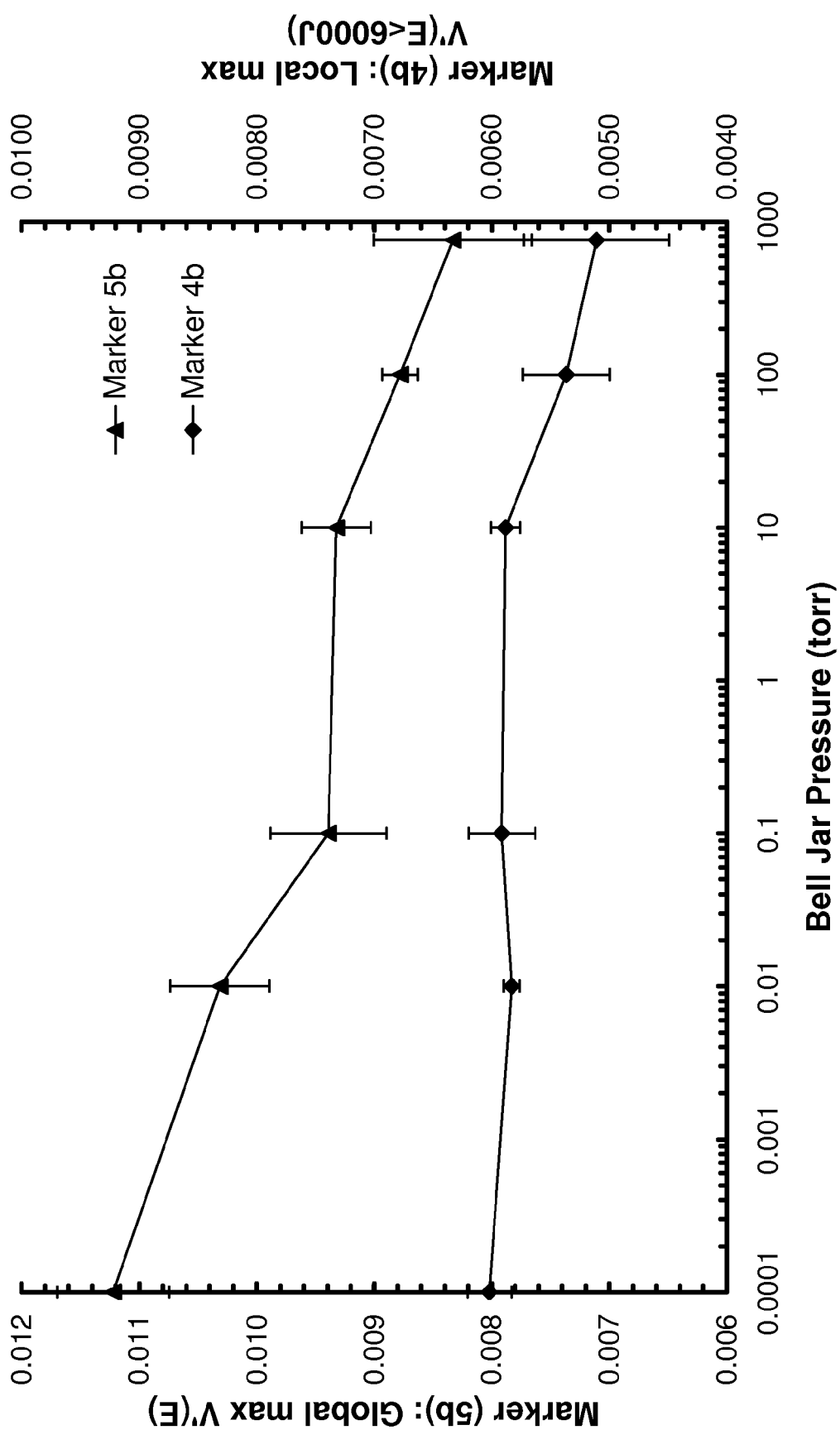
FIG. 9 is a graph depicting two markers for the second example of FIG. 7-8.

The fourth and fifth markers were revised to correspond to the second highest value of V' in the respective regions of interest. By using the second highest values the significance of single point spikes in the data is reduced. Due to the broadness of the maxima in the V'(E) curve, the peak value of the local maxima are well represented by a few data points, so throwing out the highest value still gives a fairly good representation of the peak V'(E) attained, while weeding out spurious data points. FIG. 9 shows the measured values of the revised fourth and fifth markers as a function of bell jar pressure, with the error bars indicating the standard deviation resulting from five repetitions. For the run-up path chosen, the markers were determined at approximately 35-40 and 70-110 seconds after ignition, respectively.

Figure 10:
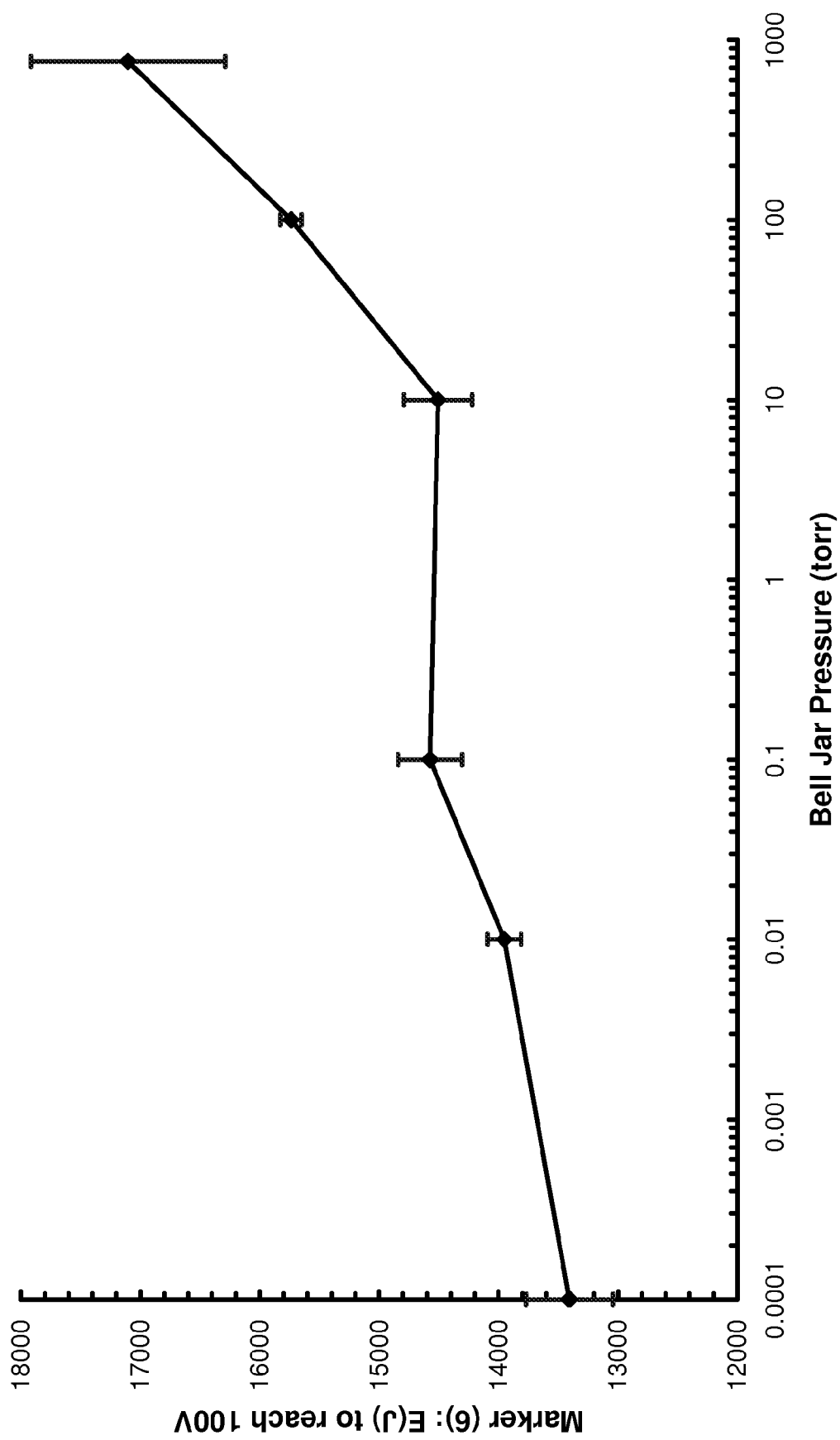
FIG. 10 is a graph depicting a third marker for the second example of FIG. 7-8.

The third marker, the final lamp voltage, was found to be relatively insensitive to bell jar pressure for this 400 W lamp example. However, the energy required to reach a specified reference voltage, say 100V, exhibited a dependence on bell jar pressure. As heat losses increase with bell jar pressure, it is expected that more energy is required from the ballast to heat the arc tube sufficiently to evaporate enough mercury to reach the reference voltage. FIG. 10 shows the measured values of a sixth marker as a function of bell jar pressure, with the error bars indicating the standard deviation resulting from five repetitions. For the run-up path chosen, the sixth marker was determined at approximately 80-100 seconds after ignition.

The data indicate that the revised fifth marker might be used to detect increases in outer jacket pressure (from vacuum) which are greater than 100 torr. The revised fourth marker exhibits a similar but less sensitive dependence on bell jar pressure compared to the revised fifth marker. The sixth marker also appears useful for detecting outer jacket pressure increases which are greater than 100 torr.

While embodiments of the present invention have been described in the foregoing specification and drawings, it is to be understood that the present invention is defined by the following claims when read in light of the specification and drawings.

We claim:

1. A method of detecting a leak in an outer jacket of a metal halide lamp having an arc tube inside the outer jacket and operated by a ballast, the method comprising the steps of:
   in the ballast, monitoring a first electrical characteristic of the lamp during start of the lamp; and
   detecting a leak in the outer jacket when the monitored first electrical characteristic deviates from a predetermined value of the first electrical characteristic,
   wherein the first electrical characteristic is one of (1) V'(E) at a predetermined E, where V'(E) is a derivative of lamp voltage V as a function of cumulative energy E delivered to the ballast since ignition, (2) a value of E at which V'(E) reaches a maximum, (3) V at a predetermined E, (4) a local maximum of V'(E) up to a predetermined E, (5) a global maximum of V'(E), and (6) E required to achieve a predetermined V.

2. The method of claim 1, further comprising the step of arranging the ballast to monitor the first electrical characteristic, to include the predetermined value of the first electrical characteristic, and to compare the monitored first electrical characteristic with the predetermined value of the first electrical characteristic.

3. The method of claim 1, further comprising the step of triggering an alarm signal when the detecting step detects the leak.

4. The method of claim 1, further comprising the step of recording a value of the first electrical characteristic in a test lamp whose outer jacket does not have a leak during start of the test lamp, the recorded value being the predetermined value of the first electrical characteristic.

5. The method of claim 1, where the first electrical characteristic is V'(E) at a predetermined E.

6. The method of claim 1, where the first electrical characteristic is the value of E at which V'(E) reaches a maximum.

7. The method of claim 1, where the first electrical characteristic is the V at a predetermined E.

8. The method of claim 1, where the first electrical characteristic is the local maximum of V'(E) up to a predetermined E.

9. The method of claim 1, where the first electrical characteristic is the global maximum of V'(E).

10. The method of claim 1, where the first electrical characteristic is the E required to achieve a predetermined V.

11. The method of claim 1, further comprising the steps of, in the ballast monitoring a further electrical characteristic of the lamp during steady state operation of the lamp, and detecting a leak when the monitored further electrical characteristic during steady state operation deviates from a predetermined value of the further electrical characteristic.

12. The method of claim 1, further comprising the steps of, in the ballast periodically measuring a re-strike voltage of the lamp during shut off of the lamp, and detecting a leak when the monitored re-strike voltage during shut off deviates from a predetermined value of the re-strike voltage.

13. The method of claim 1, further comprising, in the ballast, monitoring a plurality of different ones of the first electrical characteristic, and repeating the detecting step for each of the plurality of different ones of the first electrical characteristic, using a respective different predetermined value for each of the plurality of different ones of the first electrical characteristic.

14. A ballast for a metal halide lamp that has an arc tube inside an outer jacket, the ballast comprising a processor that is arranged to monitor a first electrical characteristic of the lamp during start of the lamp, to include a predetermined value of the first electrical characteristic, to compare the monitored first electrical characteristic with the predetermined value of the first electrical characteristic, and to report a leak in the outer jacket when the monitored first electrical characteristic deviates from a predetermined value of the first electrical characteristic, wherein the first electrical characteristic is one of (1) V'(E) at a predetermined E, where V'(E) is a derivative of lamp voltage V as a function of cumulative energy E delivered to the ballast since ignition, (2) a value of E at which V'(E) reaches a maximum, (3) V at a predetermined E, (4) a local maximum of V'(E) up to a predetermined E, (5) a global maximum of V'(E), and (6) E required to achieve a predetermined V.

* * * * *